UNITED STATES PATENT OFFICE.

EDMUND STIASNY, OF HEADINGLEY, LEEDS, ENGLAND, ASSIGNOR TO BADISCHE ANILIN & SODA FABRIK, OF LUDWIGSHAFEN-ON-THE-RHINE, GERMANY, A CORPORATION.

PRODUCTION OF NEW TANNING MATERIALS.

1,237,405.     Specification of Letters Patent.     Patented Aug. 21, 1917.

No Drawing.     Application filed August 20, 1912. Serial No. 716,020.

*To all whom it may concern:*

Be it known that I, EDMUND STIASNY, subject of the Emperor of Austria, residing at Headingley, Leeds, England, have invented new and useful Improvements in the Production of New Tanning Materials, of which the following is a specification.

I have found that new and useful products can be obtained by condensing a monohydroxylated phenolic body with sulfuric acid and formaldehyde under mild conditions, so that essentially products soluble in water are formed. The bodies so obtained can be used as substitutes for the natural tanning agents in the production of leather from hides. The reaction can be effected either by treating a phenolic body with formaldehyde in the presence of dilute acid and then sulfonating the insoluble condensation products by treatment with strong sulfuric acid until they are soluble in water, or the reaction product of a phenolic body with concentrated sulfuric acid, or a phenol sulfonic acid, or a mixture of a phenol and a phenol sulfonic acid, can be treated with formaldehyde. To avoid the formation of the known products which are insoluble in water and which may result by a violent action, care is to be taken as above mentioned, that the process goes on under mild conditions, so as to cause a smooth reaction between the components. For instance, rise of temperature due to the reaction should be avoided in any suitable way, such as by applying cooling during the reaction, at least when employing large quantities and a great strength of acid, a lower temperature being suitable when employing a strong sulfuric acid than with a less concentrated sulfuric acid, and the reaction requiring a longer time when using a dilute acid than with a strong acid and so on. The various conditions as to temperature, time, strength and quantities are therefore mutually dependent on one another, so that it will be clear that it is impossible to give definite limits of general validity for each of these factors, but the exact conditions can easily be found out in each special case. The test is very simple: The conditions are properly chosen when the reaction mass dissolves in water and no or no considerable amount of insoluble, resinlike products separates out. Instead of using formaldehyde itself, bodies which give rise to formaldehyde can be used, and instead of sulfuric acid, substituted sulfuric acids can be employed, either wholly, or in part.

Under the term monohydroxy phenolic body I include phenol and the cresols and homologues thereof.

My new compounds are characterized by being light colored amorphous compounds containing organically bound sulfur. They are soluble in water, giving rise to almost colorless solutions which assume a red to blue color on the addition of a solution of ferric salt. They are capable of tanning hides and, like the usual tanning agents, do not completely permeate hides immersed in the solutions within two hours, so that if a hide has thus been immersed and after two hours is cut through and the cut edge touched with a solution of iron alum, the outer edges assume a dark red to violet color, while the inner portions of the cut edges remain substantially uncolored.

My new compounds are probably diphenyl-methane derivatives and on treatment with cold aqueous and slightly alkaline solution with a small quantity of alcoholic tetrachlorquinone a coloring matter is formed.

The following are examples of how my invention can be performed, but the invention is not confined to these examples.

Example 1.

Mix 4 kilos of phenol, or of cresol, with 4 kilos of concentrated sulfuric acid and heat the mixture for some time at from 100° to 120° C. It is not necessary to heat the mixture as the rise of temperature upon adding the phenol, or the cresol, to the sulfuric acid is usually sufficient to bring about the desired combination. The sulfonated mixture is cooled and treated with 900 cubic centimeters of 40 per cent. formaldehyde solution. Run this in slowly and cool the mixture to avoid any considerable rise of temperature. When the reaction is over, the product obtained is an almost colorless viscous mass which is soluble in cold water. The solution can be employed as a tanning vat. Before use the reaction product can be treated with alkali, such as caustic soda, or soda, but it is not advisable to neutralize the mixture completely, or to make it alkaline.

Example 2.

Heat together for a few hours, at from 40° to 50° C., 1 kilo of phenol, 2 liters of water, 400 grams of sulfuric acid and from 200 to 300 cubic centimeters of formaldehyde containing 40 per cent. of aldehyde. Allow the mixture to cool, separate the oily layer from the water and treat the said oily layer with about 1,000 grams of sulfuric acid, until the reaction product is soluble in water. The clear acid layer separated as aforesaid can be used, instead of the water prescribed, in the preparation of the next bath. This method of working also yields a viscous product which is readily soluble in cold water.

The quantity of formaldehyde used can be varied considerably, but the amount used as maximum should not be so great that insoluble products are formed to any essential extent, whether at once or even upon allowing the reaction mass to stand for a considerable time.

Now what I claim is:—

1. The process of producing materials suitable for use in tanning by condensing a monohydroxy phenolic body with sulfuric acid and formaldehyde under mild conditions, so that essentially products soluble in water are formed.

2. The process of producing materials suitable for use in tanning by treating a sulfonic acid of a monohydroxy phenol with formaldehyde under mild conditions. so that essentially products soluble in water are formed.

3. The process of producing materials suitable for use in tanning by treating a mixture of a monohydroxy phenolic body with a sulfonic acid of a monohydroxy phenolic body with formaldehyde under mild conditions, so that essentially products soluble in water are formed.

4. As new articles of manufacture condensation products of a monohydroxy phenolic body with sulfuric acid and formaldehyde, which new compounds are light colored, amorphous bodies containing organically bound sulfur, which are soluble in water yielding almost colorless solutions which become deeply colored on the addition of a solution of ferric salt, which tan hides, and the cold aqueous and slightly alkaline solutions of which, upon the addition of a small quantity of alcoholic tetrachlorquinone, give rise to a coloring matter.

In testimony whereof I have hereunto set my hand in the presence of two subscribing witnesses.

EDMUND STIASNY.

Witnesses:
 E. JOHNSSAY,
 ERIC PUPPE.